UNITED STATES PATENT OFFICE.

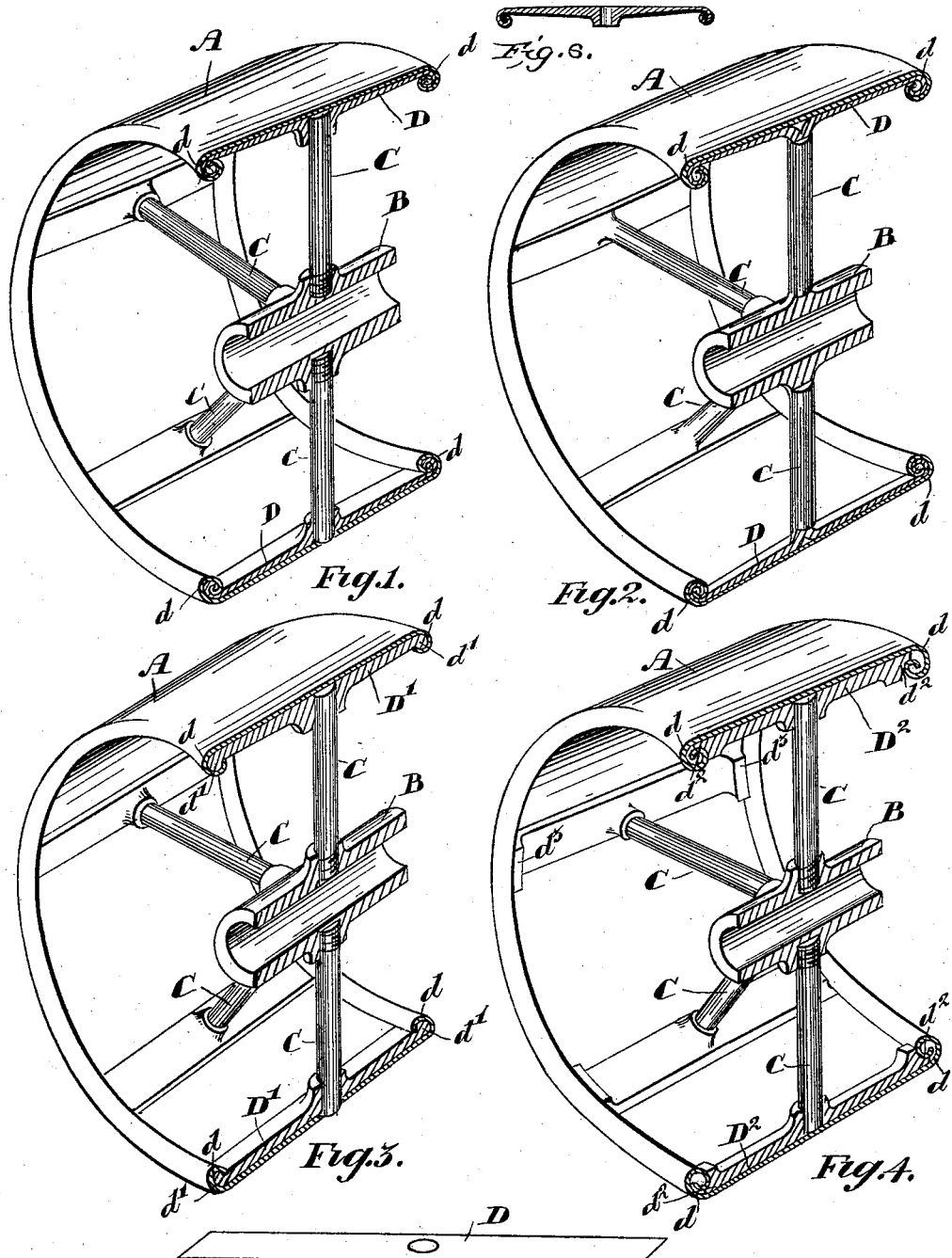

JOHN PELL NORTHEY, OF TORONTO, CANADA.

WHEEL.

SPECIFICATION forming part of Letters Patent No. 589,191, dated August 31, 1897.

Application filed November 6, 1896. Serial No. 611,290. (No model.)

*To all whom it may concern:*

Be it known that I, JOHN PELL NORTHEY, of the city of Toronto, in the county of York, in the Province of Ontario, Canada, have invented certain new and useful Improvements in Wheels, of which the following is a specification.

My invention relates to improvements in pulleys and wheels; and the object of the invention is to produce a light and strong pulley which may be easily and cheaply manufactured; and it consists, essentially, in making the rim of the pulley separately from the hub and arms or spokes and providing a head for each spoke which is of peculiar form and is rigidly connected at the outer ends to convolute beads formed on the edges of the rim, as hereinafter more particularly explained.

Figure 1 is a sectional perspective view of a pulley constructed in accordance with my invention and with the heads of the arms or spokes made in the preferred form. Figs. 2, 3, and 4 are similar views of alternative forms. Fig. 5 is a detail of the spoke-head as it would appear before the ends are rolled or spun into convolute form. Fig. 6 is a detail view of the spoke-head with the end beaded.

In the drawings like letters of reference indicate corresponding parts in each figure.

A represents the rim of the pulley, which is preferably made of sheet or other pliable metal capable of being bent or spun into any desired shape.

B represents the hub, and C the arms, which are suitably secured in the hub, as shown in Figs. 1, 3, and 4, or form part thereof, as shown in Fig. 2. The arm C may be made tubular or solid in any desired shape.

D represents the head of each arm, which is made in the form of a cross-piece, being gradually tapered toward each end. The head D is connected to the arm C in any suitable manner, such as shown in Figs. 3 and 4, or is made solid with the arm, as shown in Fig. 2, in which the arm is divided at the top and half bent to each side. In the form in which the heads are separate from the spokes a boss is preferably projected centrally from the heads to receive the ends of the spokes.

The head D (shown in Fig. 1) is made of pliable metal, in order that the ends may be rolled or bent into any desired shape. The spoke-heads D and rim before being rolled are preferably less in width, and in fastening the rim to the spokes it is placed around the spoke-heads, so that the edges of the rim overhang the edges of the spoke-heads. The edges of the rim and cross-heads are then rolled or spun together into spiral convolutions on the under side of the spoke-heads, thereby forming convolute beads $d$ on the edges of the rim. By this means the rim and spoke-heads are inseparably bound together.

Although in practice I find it preferable to connect the convolute beads to the ends of the spoke-heads in the manner described, other suitable ways might be devised whereby the ends of the spoke-heads may be securely held by the convolute beads on the edge of the rim, it being, however, essential that the ends of the spoke-heads enter into the convolutions of the beads sufficiently so as to bind them together.

I find it preferable to make the rim and spoke-heads either of malleable or wrought iron, in order that they can be readily worked up into the desired shape without the danger of breaking or risk of weakening any of the parts. I may, however, stamp or form both of these parts out of sheet-steel.

In Fig. 3 I show the spoke-heads $D'$ with beaded ends $d'$, which beaded ends enter into the beaded edges of the rim, which beaded edges in this case would merely have a part convolution, as indicated.

In Fig. 4 the beaded edge $d$ is formed with a plurality of convolutions, and the spoke-head $D^2$ has an inwardly-projecting portion $d^2$, which enters the convolution sufficiently so that when the bead is formed up the ends of the spoke-heads are securely wedged and bound into the bead. In this form I preferably form shoulders $d^3$ on the inside of the convolute bead as an auxiliary means to insure the binding of the ends of the spoke-heads to the convolute bead.

In the construction of a pulley such as I describe it will be seen that the employment of rivets, bolts, or other like fastening devices is entirely avoided in the attaching of the spokes or spoke-heads to the rim.

It will thus be seen that a pulley or wheel manufactured in accordance with my invention may be made cheaper, more easily, and of a maximum strength for the material used.

What I claim as my invention is—

1. In a pulley or wheel, the combination with the spokes and hub, of a rim formed separately from the spokes and having convolute beads at the edges thereof, spoke-heads connected to the spokes extending across within the rim, and having the ends entering into the convolute beads and held therein as and for the purpose specified.

2. In a pulley or wheel, the combination with the spokes and hub, of a rim formed separately from the spokes and having convolute beads at the edges thereof, and spoke-heads connected to the ends of the spokes, extending across within the rim and having reduced outer ends which are formed up into convolutions within the convolute beads and following the convolutions of the bead as and for the purpose specified.

3. In a pulley or wheel, the combination with the spokes and hub, of a rim formed separately from the spokes and having convolute beads at the edges thereof, spoke-heads extending across within the rim and having central bosses to receive and hold the ends of the spokes, the reduced outer ends to such spokes entering into and being held in the convolute beads as and for the purpose specified.

JOHN PELL NORTHEY.

Witnesses:
B. BOYD,
H. DENNISON.